US008226417B2

(12) United States Patent
Mitsuyoshi

(10) Patent No.: US 8,226,417 B2
(45) Date of Patent: Jul. 24, 2012

(54) WILL EXPRESSION MODEL DEVICE, PSYCHOLOGICAL EFFECT PROGRAM, AND WILL EXPRESSION SIMULATION METHOD

(75) Inventor: Shunji Mitsuyoshi, Shinagawa-ku (JP)

(73) Assignees: A.G.I. Inc., Tokyo (JP); Shunji Mitsuyoshi, Tokyo (JP)

( * ) Notice: Subject to any disclaimer, the term of this patent is extended or adjusted under 35 U.S.C. 154(b) by 1685 days.

(21) Appl. No.: 10/592,683

(22) PCT Filed: Mar. 28, 2005

(86) PCT No.: PCT/JP2005/005747
§ 371 (c)(1),
(2), (4) Date: Sep. 13, 2006

(87) PCT Pub. No.: WO2005/093650
PCT Pub. Date: Oct. 6, 2005

(65) Prior Publication Data
US 2007/0196797 A1    Aug. 23, 2007

(30) Foreign Application Priority Data
Mar. 26, 2004    (JP) .................. 2004-091607

(51) Int. Cl.
G09B 19/00    (2006.01)
(52) U.S. Cl. .......................... 434/236; 706/15
(58) Field of Classification Search .................. 434/219, 434/236; 706/15
See application file for complete search history.

(56) References Cited

U.S. PATENT DOCUMENTS

| 6,418,435 | B1 | 7/2002 | Chase | |
| 6,606,479 | B2* | 8/2003 | Cook et al. | 434/350 |
| 7,664,627 | B2* | 2/2010 | Mitsuyoshi | 704/1 |
| 2001/0042057 | A1* | 11/2001 | Ikebe et al. | 706/11 |
| 2002/0062297 | A1* | 5/2002 | Mizokawa | 706/15 |

FOREIGN PATENT DOCUMENTS

| EP | 1 318 505 A1 | 6/2003 |
| EP | 1 553 520 A1 | 7/2005 |

(Continued)

OTHER PUBLICATIONS

Fukui, et al., "Multimodal Personal Information Provider using Natural Language and Emotion Understanding from Speech and Keyboard Input," Jan. 11, 1996, pp. 43-48.

(Continued)

*Primary Examiner* — Xuan Thai
*Assistant Examiner* — Banafsheh Hadizonooz
(74) *Attorney, Agent, or Firm* — Squire Sanders (US) LLP

(57) ABSTRACT

The present invention provides a will-expression modeling device simulating human will-expression responding to an direction input given from the outside, which includes an interest interpretation section, an emotion creating section and a will-expression section. The interest interpretation section collates the direction input with a predetermined hedonic interest relationship table and outputs a mood factor representing pleasure, displeasure or the like. The emotion creating section prepares a plurality of emotional states obtained by modeling human emotions as data and causes state transitions to occur in the emotional states according to the mood factor to simulate a change in human emotion responding to the direction input. The will-expression section prepares in advance a plurality of mental-will states obtained by modeling human will as data and selects a new mental-will state from the emotional states or a "combination of a mental-will state and an emotional state".

10 Claims, 7 Drawing Sheets

FOREIGN PATENT DOCUMENTS

| | | |
|---|---|---|
| JP | 11-265239 | 9/1999 |
| JP | 2001-154707 | 6/2001 |
| JP | 2001-209779 | 8/2001 |
| JP | 2002-215183 | 7/2002 |
| KR | 20010025161 A | 4/2001 |
| WO | WO 2004/032045 A1 | 4/2004 |

OTHER PUBLICATIONS

Masaki Chikama, et al., "An Emotion Model and Simulator based on Embodiment and Interaction for Human Friendly Robots," Mar. 27, 2000, pp. 13-18.

P.J. Gmyreasuewucz, et al.; "Emotions and Personality in Agent Design and Modeling"; 2001; pp. 1-8; XP-002443979.

H. Miwa, et al.; "Robot Personality Based on the Equations of Emotion Defined in the 3D Mental Space"; May 21-26, 2001; pp. 2602-2607.

Akiro Sato, et al.; "An Impression-Based Retrieval System of Music Collection"; Aug. 30, 2000; pp. 856-859.

Fuji Ren, et al.; "Researches on the Emotion Measurement System"; Oct. 5, 2003; pp. 1666-1672.

Shunji Mitsuyoshi, et al.; "The Sensibility Interference Function by Psycho-Quantum Computer"; Oct. 5, 2003; pp. 1679-1686.

Fuji Ren, et al.; "To Understand and Create the Emotion and Sensitivity"; Oct. 5, 2003; pp. 547-555.

Shunji Mitsuyoshi, et al.;"Sentience System Computer: Principles and Practices"; Oct. 6, 2002; pp. 557-564.

Supplemantary Partial European Search Report, 05727819.4, dated Mar. 4, 2009.

\* cited by examiner

WILL EXPRESSION MODEL DEVICE, PSYCHOLOGICAL EFFECT PROGRAM, AND WILL EXPRESSION SIMULATION METHOD

CROSS-REFERENCE TO RELATED APPLICATION

This application is a U.S. nationalization of International Application PCT/JP2005/005747, filed Mar. 28, 2005, which claims the benefit of priority from Japanese Patent Application No. 2004-091607, filed Mar. 26, 2004.

TECHNICAL FIELD

The present invention relates to a will-expression modeling device for simulating human will-expression, a method thereof and a program thereof.

Particularly, the present invention relates to a technique applicable to the following field of products and the like.

(1) A purposive and more natural inquiry and response system, an artificial intelligence, a judgment system, a virtual ego system and a communication system each of which utilizes a computer and has own will and ego (2) A robot capable of responding with more natural reaction to a direction input by a human (3) An experimental model having a human-like psychological state (4) A play game system (game, pachinko, slot machine etc) capable of reflecting more human-like emotion and response (5) An agent system (6) A system capable of environmental setting reflecting psychological effect (7) An information machine, system, apparatus which require more human-like judgment, such as control system, search system, user interface, operation system, application program, MPU, memory, numerical calculation, package, expert system, input device and the like (8) A system for creating virtual and human-like characters (9) A system for automatically generating scenario and/or motion

(10) A communication (so to speak, a heart-to-heart communication) system having a function to exchange emotion and mentality. Particularly, a heart-to-heart communication system, which enables communication between humans, who are difficult to use languages, by utilizing sympathetic vibration and resonance of emotion and mentality

(11) An assistant and support system for analyzing human psychology.

BACKGROUND ART

As a prior art relevant to the present invention, "emotion generating device and emotion generating method" disclosed in a patent document 1 is known. The emotion, which represents internal state of a human, variously changes depending on the situation. The patent document 1 discloses a technique for achieving generation of emotions under unforeseeable situation. That is, while referring to a foreseeable situation, the situation is estimated and emotion of the device itself is generated. Also, emotions actually generated in the past and the situations at that time are subjected to an analysis to learn unforeseeable collateral conditions peculiar to the respective situations and corresponding emotions. When a newly input situation fulfills the learnt collateral conditions, the emotion corresponding to the collateral conditions is outputted.

Also, the inventor of the present invention has disclosed "feeling generating method, feeling generating device and software" in a patent document 2. In this prior art, based on input information such as emotional state of the other party of a dialogue, instinct parameters representing comfort, a dangerous level and an achievement level are generated as motivating information, and based on the instinct motivating information, basic emotion such as delight, anger and the like are controlled to be generated. Particularly, the prior art was successful in generating more human-like emotional state by reflecting individuality such as rational nature and will to the control rules (in human, characteristics) when controlling to generate a basic emotion.

[Patent document 1] Japanese Unexamined Patent Application Publication No. Hei 11-265239

[Patent document 2] Japanese Unexamined Patent Application Publication No. 2002-215183

DISCLOSURE OF INVENTION

Problem to be Solved by the Invention

Incidentally, even when an unforeseeable direction input is given, a human being is capable of flexibly replying with a rational response and action. Also, even when a plurality of direction inputs is given, a human being is capable of replying with natural response and action, which are not inconsistent with each other.

One of the solutions to achieve such a highly human-like behavior on a machine is to determine the respective responses to every foreseeable direction input in advance and to put them into a program.

However, in the above measure, since the program has to be written while minutely associating various responses with each of the direction inputs, a huge amount of programs are required accordingly. It is called a frame problem.

Also, as to a direction input, which is not programmed, since a machine is not able to reply with appropriate response, such a machine, which is poor in flexibility, is resulted in.

Further, since a huge amount of responses have to be programmed, entire conformity is apt to lack among the respective responses. Therefore, there may arise paradoxical problems difficult to solve such that associated direction inputs may be replied with antagonistic responses.

Further, in such the measure, since programmed, canned and automatic responses are always replied, human beings become to be able to foresee such responses and bored therewith some day.

To avoid such problems, the inventor of the present invention thought that behaviors close to human ego had to be achieved on a machine.

Ordinarily, a human being awakes his/her own ego at age of 2-3, and not only being simply obedient to direction inputs from the environment, but he/she replies unique and various responses automatically.

When he/she is further aged and his/her ego has developed, he/she becomes to reply with higher sophisticated responses such as "common sense", "super-ego", "service-minded consciousness", "spirit of self-sacrifice" and the like.

As described above, the determination and response of human beings are not always predetermined, but response is determined on the basis of a conscious or unconscious ego (will).

On the basis of the above-described examination, the inventor of the present invention thought that, by generating ego (will) close to that of human beings on a machine, response and action can be determined in accordance with the will. That is, in the case where the response and action are based on the will, not all reactions require to be programmed in advance, and entirely well balanced and human-like responses and actions can be determined.

Therefore, it is an object of the present invention to achieve behaviors close to the ego (will) of human beings on a machine.

Also, another object of the present invention is to provide a technique to adjust and change the mechanical ego in order to respond based on a common sense, which is further closer to that of human beings.

Means for Solving the Problem

<1> A will-expression modeling device according to the present invention is a device simulating human will-expression responding to an direction input given from the outside, which includes an interest interpretation section, an emotion creating section and a will-expression section.

The interest interpretation section collates the direction input with a predetermined hedonic interest relationship table (positive or negative etc) and outputs a mood factor representing pleasure, displeasure or the like.

The emotion creating section prepares a plurality of emotional states obtained by modeling human emotions as data and causes state transitions to occur in the emotional states according to the mood factor to simulate a change in human emotion responding to the direction input.

The will-expression section prepares in advance a plurality of mental-will states obtained by modeling human will as data and selects a new mental-will state from the emotional states or a "combination of a mental-will state and an emotional state".

Also, by communicating the emotional state generated as described above to the outside, a communication or a heart-to-heart communication system capable of exchanging (communication) emotion and/or mentality may be preferably achieved.

<2> Also, preferably, the interest interpretation section receives an instruction input representing "encouragement", "suppression" or the like from an outside instructor, who has determined a relationship between the direction input and the mental-will states. Upon receiving the instruction input, the interest interpretation section redefines the hedonic interest relationship table in the direction that coincides with the instruction input. Owing to such operation, by orienting the direction of the interest interpretation, the will-expression of the device is made closer to common sense or super-ego of human beings.

Note that, by utilizing the will-expression generated as a result of orientation of the interest interpretation, a scenario is preferably generated.

<3> Further preferably, the emotion creating section is provided with an affect interference section and an emotion transition section.

The affect interference section prepares in advance a function obtained by modeling spontaneous rhythm of human affect and generates an interference state by modulating the function with the mood factor.

The emotion transition section simulates the change in human emotion by causing the state transitions to occur in the emotional states based on the interference state.

<4> Further preferably, there is provided such an output generating section that generates a scenario or motion as an output responding to the direction input by selecting, modifying, or combining prepared action pattern(s) in accordance with the selected mental-will state.

Further, the motion is preferably outputted as a voice, effect sound or appearance of a "robot", "character of an image".

The scenario is preferably automatically generated in a mode of a creation of data such as a character, dialogue, action, appearance and background being combined with each other.

<5> Further preferably, the interest interpretation section detects an emotional state of a direction input source (hereinafter, referred to as "other party") based on the direction input. And the interest interpretation section collates an "emotional state of the other party" or a "direction input and emotional state of the other party" with the hedonic interest relationship table to output a mood factor representing pleasure or displeasure.

Also, by communicating the emotional state detected as described above to the outside, a communication or a heart-to-heart communication system capable of exchanging emotion and mentality (communication) may be preferably achieved.

<6> Further preferably, the interest interpretation section collates the direction input with a predetermined purpose and application table to detect a purpose and application of the direction input. Also, the interest interpretation section collates the direction input with a predetermined thought level table to detect at what thought level from a primitive level to an abstract level a thought of the other party is. And the interest interpretation section detects in further detail the emotional state of the other party by adding the purpose and application and the thought level to the detected emotional state of the other party as classification item data.

Note that the purpose and application and the thought level are preferably applied to psychoanalysis of the other party (in this case, objective person of psychoanalysis).

Also, by communicating the detected purpose and application and the thought level to the outside, a communication or a heart-to-heart communication system capable of exchanging emotion and mentality (communication) may be preferably achieved.

<7> Further preferably, the interest interpretation section generates a PS-D parameter that converges from a paranoid-schizoid state to a depressive state in an oscillating or non-oscillating manner in accordance with the level of anxiety represented by the emotional state of the other party. And, the interest interpretation detects in further detail the emotional state of the other party section by adding the PS-D parameter to the detected emotional state of the other party as classification item data.

Note that the PS-D parameter is preferably applied to psychoanalysis of the other party (in this case, objective person of psychoanalysis).

Also, by communicating the detected PS-D parameter to the outside, a communication or a heart-to-heart communication system capable of exchanging emotion and mentality (communication) may be preferably achieved.

Note that the PS-D parameter is preferably reflected to a wobble/fluctuation of the emotional state to simulate more actual transition of the emotion (and computer-ego reacting thereto).

<8> Further preferably, the emotion creating section collates the mental-will state with a predetermined purpose and application table to detect a purpose and application of the mental-will state. Also, the emotion creating section collates the mental-will state with a predetermined thought level table to detect at what thought level from a primitive level to an abstract level the mental-will state is. And the emotion creating section detects in further detail the emotional state of the device side by adding the purpose and application and the thought level to the emotional state of the device side as classification item data.

Note that, by communicating the purpose and application and thought level to the outside, a communication or a heart-to-heart communication system capable of exchanging emotion and mentality (communication) may be preferably achieved.

<9> Further preferably, the emotion creating section generates a PS-D parameter that converges from a paranoid-schizoid state to a depressive state in an oscillating or non-oscillating manner in accordance with the level of anxiety represented by the emotional state of the device side. And the emotion creating section detects in further detail the emotional state of the device side by adding the PS-D parameter to the emotional state of the device side as classification item data.

Note that the PS-D parameter is preferably reflected to wobble/fluctuation of the emotional state to simulate more actual transition of the emotion (and computer-ego reacting thereto).

<10> A psycho-effect program of the present invention is a program to cause a computer to function as a will-expression modeling device set forth in any one of the above <1> to <9>

<11> A will-expression simulation method of the present invention is an invention pertinent to a method category corresponding to the invention of the device according to the above claim <1>.

Effect of the Invention

<1,11> The inventor of the present invention found that the human will-expression could be modeled through the following process, i.e., direction input→mood generation→emotion transition→will-expression. Hereinafter, the process will be described in accordance with the process.

(1) From Direction Input to Mood Generation

Human being unconsciously feels a mood like a pleasure or displeasure (positive/negative) with respect to a direction input from the outside. The mood is an important factor for determining human will-action.

Ordinarily, what is generating such mood in human being is a complicated psychological process relevant to "learning", "previous experiences (trauma)" or the like.

It is technically extremely difficult to describe such complicated psychological process in detail for modeling and to realize it in a mechanical manner. Also, since large differences are found among the individuals, there is such a problem that a large number of models equivalent to that of human beings are required.

Then, the inventor of the present invention found that, from the viewpoint of relationship between the input and the output in the psychological process, the mood generating mechanism could be simplified into a "problem of interpretation of interest relationship."

That is, human being feels a mood of "pleasure" when given direction input agrees with his/her interest (in other words, his/her sense of value); contrarily, in case of the disagreement, human being feels a mood of "displeasure". Since such interpretation of interest relationship is a direct reaction, the interpretation of interest relationship can be put entirely into a hedonic interest relationship table in advance as data.

If the kinds of the mood count a huge number, since many different moods have to be minutely associated with each of the direction inputs, preparation work of the hedonic interest relationship table becomes enormous amount of works for a developer.

However, since the mood felt by human being is intuitive, actual kinds of the moods are small. For example, the moods can be roughly sorted into pleasure, composure, displeasure and the like. Therefore, the developer has to only sort the respective direction inputs into rough groups to prepare the hedonic interest relationship table in advance, resulting in a relatively small amount of works.

Upon receiving an direction input from the outside, the interest interpretation section of the present invention collates the direction input with the predetermined hedonic interest relationship table and generates a mood factor representing a pleasure, displeasure or the like.

(2) From Mood Generation to Emotion Transition

The will-action of human being is largely influenced by a mood such as a pleasure or displeasure. However, such a temporal mood rarely links directly to the will or action. For example, even when a mood of "displeasure" is temporarily generated, when the mood has been stable in a state of plus emotion at that time, he/she hardly selects a temporal disobedient action. By taking into consideration such human behaviors, more highly human-like will-expression can be simulated.

Thus, in the present invention, the mood is not directly reflected on the will-action, but is reflected on an emotional state first. Therefore, in the present invention, emotional states, which are defined on the basis of level of delight, anger, sorrow, pleasure or the like, are prepared in advance as data. And such emotional states are caused to transit on the basis of a mood factor such as a pleasure or displeasure. For example, with respect to a well mood generation, the emotional state is caused to transit in a positive direction. Contrarily, with respect to a mood generation of displeasure, the emotional state is caused to transit in a negative direction.

Owing to such operation, emotional changes of human being, which subtly fluctuate depending on a mood generated by a direction input, can be simulated on a machine.

(3) From Emotion Transition to Will-Expression

Ordinarily, in the case where a human is in a plus emotional state, his/her will-action becomes positive, spontaneous, or obedient. On the other hand, in a minus emotional state, his/her will-action becomes negative, involuntary, or disobedient.

In any cases, since correspondence between the emotional state and the will-action is relatively simple and direct, entire correspondence relationship between them can be easily collected for modeling. Therefore, with respect to the present emotional state or a "combination of a mental-will state and an emotional state", the will-expression section of the present invention collates the correspondence relationship therebetween to determine a mental-will state, which the human will express to the direction input.

(4) Effect

By expressing a mental-will state through the above-described process, a behavior close to human ego (will) can be appropriately achieved on a machine.

<2> In the above-described process of will-expression, by characterizing the hedonic interest relationship table, a personality can be characterized.

That is, when a hedonic interest relationship table is set up on the basis of self-concern, a self-protective and selfish will-expression can be simulated.

Also, when a hedonic interest relationship table is set up on the basis of family/group-concern, a will-expression oriented appropriate harmony can be simulated.

Further, when a hedonic interest relationship table is set up on the basis of altruism but not selfish, a will-expression of further common sense or super-ego can be simulated.

Therefore, in the will-expression process of the present invention, by redefining the hedonic interest relationship table, a desired character can be achieved.

In the case of human being, ordinarily, by accumulating experiences through communications with the environment, such growth of character is achieved. In the present invention, in place of accumulating such experiences, a instruction input, which represents "encouragement", "suppression" or the like is received from an instructor (human etc), who has evaluated the relationship between an direction input and a mental-will state. Ordinarily, "encouragement" is a kind of reward and is given when the will-action is reasonable and of common sense. On the other hand, "suppression" is a kind of rebuke and is given when the will-action is out of common sense.

The contents of the hedonic interest relationship table are redefined in the directions in accordance with these instruction inputs. Owing to such operation, generated mood factor becomes further close to a human-like behavior of common sense (a kind of super-ego), and a will-expression can be made closer to an ideal of the instructor.

As a result, the initial state of the will-expression can be appropriately led to a will-expression of further common sense.

<3> Ordinarily, in the case of human being, even when no mood is generated, the emotional state is subtly fluctuating. By adding a fluctuation (affect) of such spontaneous emotional state to the present invention, a will-expression further closer to that of human being can be simulated.

Therefore, in the present invention, first of all, emotional states obtained by modeling human emotions are assumed. For example, such emotional state can be understood as a transition that moves within a virtual space in a coordinate system (hereinafter, referred to as "emotional space") using basic emotions such as delight, anger, sorrow, pleasure or the like as the coordinate axes.

In this case, a position of the emotional state in the space of the coordinate system can be understood as a potential of the emotion (level of present delight, anger, sorrow, pleasure or the like). Also, the transition amount of the emotional state in the space of the coordinate system can be understood as a fluctuation momentum of the emotion.

When the transition of the emotional state in a space is assumed as a completely random transition, it seems as discontinuous emotional changes, and is hardly associated with the affect with rationality and consistency. Contrarily, when the transition of the emotional state is assumed as a transition, which follows a classical dynamics, entire transition of the emotional state seems as foreseeable emotional change and cannot be associated with the uncertainty affect.

Therefore, in the present invention, a function or formula (for example, autocorrelation, wave composite interference, Bayes estimate accompanying tense, probability model, complex system, matrix, vector, Fourier analysis, general wave equation, formula used in thermodynamics, fluid model, formula used in quantum mechanics) is prepared in advance to express the fluctuating affect with appropriate uncertainty. Also, by allowing information from the outside to interfere with the above, a reaction further close to actual reaction can be achieved. By modulating the function with a mood factor, an interference state of the affect caused from the influence between the affect and the mood can be simulated. Some parameters may be combined or synthesized with each other to complicate the mood factor.

Then, by causing the emotional state to transit with the interference state as a momentum, delicate emotional changes, which fluctuate under the influence between the affect and the mood, can be simulated.

By determining the mental-will state based on the emotional state, subtly fluctuating will with respect to an identical direction input can be appropriately simulated.

<4> By selecting, modifying, or combining a prepared action pattern from the selected mental-will states as described above, a scenario or a motion can be generated as a response output to the outside. Such response output is felt as a will or an ego simulated at the machine side. Therefore, not only so-called robotic response but also response output, which is capable of causing a human as a receiver to naturally feel a character, individuality, rational nature and emotion, can be generated.

<5> Ordinarily, a mood of a human being such as a pleasure or displeasure is sharply influenced by an emotion of the other party. Therefore, when the pleasure or displeasure of the device side is determined by detecting the emotion of the other party, more natural communication can be achieved.

The inventor of the present invention has disclosed a technique in which emotion of the other party is detected based on a direction input (particularly, voice input) in the Japanese Unexamined Patent Application Publication No. 2002-215183 or the like. By utilizing such technique, an emotional state of the other party can be detected from the direction input.

By collating the detected "emotional state of the other party" or "direction input and emotional state of the other party" with the hedonic interest relationship table in place of the direction input, a mood factor representing a pleasure or displeasure is outputted.

Here, by determining the mood factor from the "emotional state of the other party", a state, in which the mood is influenced by the emotional state of the other party, can be simulated. For example, such mood simulation becomes possible that, when the other party is pleased, the mood of pleasure is enhanced; and when the other party is angry, the mood of displeasure is enhanced.

On the other hand, by determining the mood factor from a combination of the "direction input" and "emotional state of other party", a further high-level mood can be simulated. For example, when the other party outputs an irrational direction input with pleasure, a mood of displeasure is enhanced. Also, when the other party outputs an irrational direction input with sorrow, a mood of displeasure is not enhanced. Owing to such processing, a high level mood such as righteous anger, sympathy or the like can be simulated.

As described above, since the mood generation of pleasure/displeasure becomes further high level, the will-expression of the device side can be led to a further natural behavior.

<6> Now, Wilfred Bion, who is a well-known psychoanalyst, has proposed a "grid" as a technique of psychoanalysis. The grid is based on the following experiences of Bion himself.

That is, through the experiences of psychoanalysis, Bion found that each of the dialogs between a psychoanalyst and a test subject includes some kind of purpose and application therein. Then, Bion proposed that these purpose and application should be classified into "definitory hypothesis", "notation", "attention", "inquiry", "action" or the like.

Further, Bion found that thoughts behind these dialogs could be classified into several levels. For example, thoughts can be classified into "β-elements", "α-elements", "dream thought, dream, myths", "pre-conception", "conception", "concept", "scientific deductive system", "algebraic calculus" or the like, which are uniquely named by Bion. The above represent thought levels, which develop from a primitive thought to an abstract thought.

Bion disposed these two kinds of classifications on the axes of vertical and horizontal to organize a chart called grid (refer to FIG. 5). Psychoanalyst disposes mentality and thought of a test subject on the chart and traces the thoughts of the test subject, which changes as time passes to carry out psychological analysis on the test subject.

The inventor of the present invention thought that affection of the other party could be detected more minutely by applying such technique of analysis to detect thoughts of an direction input source (i.e., other party).

Then, a purpose and application table, in which the direction input and the purpose and application are associated with each other, is prepared in advance. By collating the direction input with the purpose and application table, the purpose and application of the direction input is determined.

Note that, since such minuteness that determines the purpose and application of every direction input is not required, it may be adapted so that the purpose and application table is created on typical direction inputs only and the purpose and application of the typical direction inputs only is obtained.

Further, a thought level table, in which the direction input and the thought level thereof are associated with each other, is prepared in advance. By collating the direction input with the thought level table, the direction input is detected at what thought level from a primitive level to an abstract level the direction input is.

Note that in this case also, since such a minuteness to determine the thought level about every direction input is not required, it may be adapted so that the thought level table is created with respect to typical direction inputs only and the thought level of the typical direction inputs only may be obtained.

By adding the "purpose and application" and the "thought level", which are obtained through the processing as described above, to the "emotional state of the other party" as classification item data, the emotional state of the other party can be detected minutely and correctly in view of a high level of psychological analysis.

By detecting the emotional state of the other party minutely and correctly as described above, the determined mood generation of a pleasure or displeasure corresponding thereto can be determined minutely. As a result, the will-expression of the device side based on the pleasure or displeasure can be made closer to a further minute behavior.

<7> Furthermore, above described psychoanalyst Wilfred Bion has proposed a theory of PS-D transition. The PS-D transition is a concept, which was developed based on Melanie Klein theory (when encountered with a large anxiety, human being endures the same while oscillating between a paranoid-schizoid state and a depressive state), in which the converging transition with oscillation between the paranoid-schizoid state and the depressive state is understood as a capability of integrating thoughts.

The inventor of the present invention thought that by utilizing the convergence from the paranoid-schizoid state to the depressive state, further human-like mental fluctuation could be expressed.

Then, the level of an anxiety is extracted from the detected "emotional state of the other party." Here, the anxiety preferably includes not only simple anxiety affection but also disturbance factor and stress, which may cause a paranoid-schizoid. For example, a large change in the emotional state may be set as one parameter of anxiety. Then, in accordance with the level of anxiety, a PS-D parameter, which converges from the paranoid-schizoid state to the depressive state in an oscillating or non-oscillating manner, is generated.

By adding the "PS-D parameter", which is obtained through the above processing, to the detected "emotional state of the other party" as classification item data, the emotional state of the other party can be simulated minutely including the mental fluctuation.

Minute simulation enables such a communication, which is carried out between person to person, who can not use natural languages, in a manner of sympathetic vibration or resonance utilizing an emotional element (emotion or heart), or a heart-to-heart communication.

As described above, by minutely simulating the emotional state of the other party, correspondingly determined mood generation of pleasure/displeasure can be minutely determined. As a result, the will-expression of the device side based on the pleasure/displeasure can be made close to a further natural behavior.

<8> The inventor of the present invention thought that by simulating the analyzing method described in <6> above at the device side, a human-like psychological state can be added to the emotional state of the device side.

Then, a purpose and application table, in which the mental-will state of the device side and the purpose and application thereof is associated with each other, is prepared in advance. By collating the mental-will state with the purpose and application table, the purpose and application represented by the mental-will state can be determined.

Further, a thought level table, in which the mental-will state of the device side and the thought level thereof are associated with each other, is prepared in advance. By collating the mental-will state with the thought level table, it is possible to detect at what thought level from a primitive level to an abstract level the mental-will state is.

By adding the "purpose and application" and the "thought level" to the detected "emotional state of device side" as classification item data, the emotional state of the device side can be classified more minutely in view of psychological analysis. As a result, the determined will-expression of the device side can be made close to further various behaviors.

<9> The inventor of the present invention thought to apply the PS-D transition described in the above <7> to the emotional state of the device side.

Then, the level of anxiety is extracted from the detected "emotional state of the device side". The anxiety also preferably includes not only simple anxiety affection but also a disturbing factor and a stressed state, which may cause a paranoid-schizoid. Then, in accordance with the level of the anxiety, a PS-D parameter, which converges from a paranoid-schizoid state to a depressive state in an oscillating or non-oscillating manner, is generated. By communicating the oscillating level, a communication simulating heart-to-heart communication interposed by mental fluctuation is possible.

By adding the "PS-D parameter", which is obtained through the above processing, to the detected "emotional state of the device side" as classification item data, the emotional state of the device side can be minutely simulated including the mental fluctuation.

As described above, by minutely simulating the emotional state of the device side, the will-expression of the device side, which is determined corresponding thereto can be made close to further natural behavior.

<10> By utilizing the psycho-effect program of the present invention, a computer can be caused to function as the above-described will-expression modeling device.

In addition, the above-described object and other objects in the present invention will be easily understood by referring to the following description and the attached drawings.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

BEST MODES FOR CARRYING OUT THE INVENTION

First Embodiment

Configuration of First Embodiment

Figure 1:
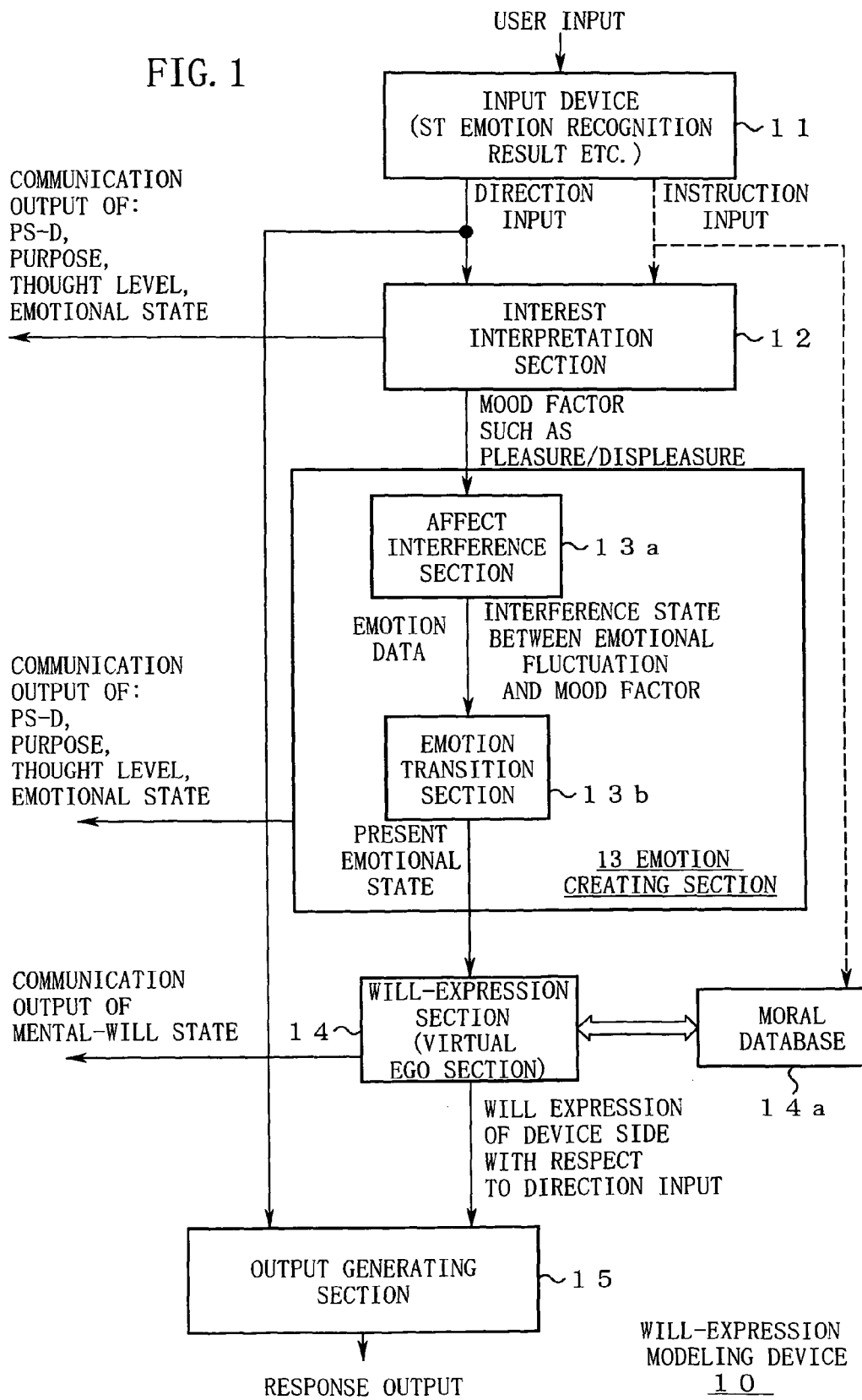
FIG. 1 is a block diagram showing a configuration of a first embodiment.

FIG. 1 is a diagram showing a configuration of a first embodiment corresponding to the appended claims 1 to 4, 10 and 11.

Referring to FIG. 1, a will-expression modeling device 10 according to the first embodiment is configured including the following component elements. Note that these component elements may be constructed by means of a hardware; or may be configured by means of software with which a psycho-effect program is executed.

(1) An input device 11 for receiving inputs from a user. For example, the input device 11 receives a direction input through the keyboard operation, a voice direction input through a voice recognition unit and a direction input from an emotion recognition unit (i.e., emotion input). Note that the instruction input from an external instructor can be also received through the input device 11.

(2) An interest interpretation section 12 that controls a predetermined hedonic interest relationship table and an emotional state table. An direction input, which is received through the input device 11, is collated with the hedonic interest relationship table and the emotional state table to surmise an emotional state of the other party, and thereby a mood factor, which represents a mood of a pleasure, displeasure or the like, is outputted. Note that, by being adapted to communicate the emotional state to the outside, a communication or a heart-to-heart communication system capable of exchanging emotion and mentality (communication) may be preferably achieved.

(3) An emotion creating section 13 that prepares mental-will states as data in which states of human emotions such as delight, anger, sorrow, pleasure or the like are modeled. The emotion creating section 13 causes transitions of emotional states according to a mood factor generated by the interest interpretation section 12 to simulate changes in human emotions while reflecting the mood generated by the direction input.

In addition, in order to achieve more delicate and human-like emotional changes, the emotion creating section 13 includes an affect interference section 13a and an emotion transition section 13b.

The affect interference section 13a prepares a function modeling spontaneous rhythm accompanying a wobble within a threshold value of human affect. By modulating fluctuation in the function with the mood factor generated from the interest interpretation section 12, an affect, intensity and frequency of which are interfered and changed by the mood, is expressed.

On the other hand, the emotion transition section 13b causes transitions of the emotional states according to the interfered affect to simulate the changes in human emotion caused by the interference between the affect and the mood.

Also, by being adapted to communicate the generated emotional state to the outside, a communication or a heart-to-heart communication system capable of exchanging emotion and mentality (communication) may be preferably achieved.

(4) A will-expression section (virtual ego section) 14 that prepares in advance a plurality of models representing states of human mental-will as data and selects a mental-will state corresponding to the emotional state.

Also, by being adapted to communicate the mental-will state, which is generated as described above, to the outside, a communication or a heart-to-heart communication system capable of exchanging mentality and will (communication) may be preferably achieved.

(5) An output generating section 15 that generates a response output to an direction input by selecting, modifying or combining the prepared action patterns in accordance with a mental-will state expressed from the will-expression section 14. For example, in the case where the direction input is given in a text mode, the syntax is modified and a response output is generated automatically. That is, in the case where a negative will is expressed with respect to an direction input like "turn off the power supply of the will-expression modeling device 10", a scenario is generated by modifying the syntax of a response output like "I do not want to turn off the power supply" or the like. That is, scenario generation utilizing the syntax is also possible. Also, computer animation or audio output corresponding to the response output may be generated and outputted.

(6) A moral database 14a that stores in advance data of response patterns of moral emotion. Also, the moral database 14a can be rewritten in accordance with an instruction input. The will-expression section 14 creates a virtual ego so as to be in harmony with the moral while making reference to the moral database with respect to the emotional state and changes thereof.

Operation of the First Embodiment

Figure 2:
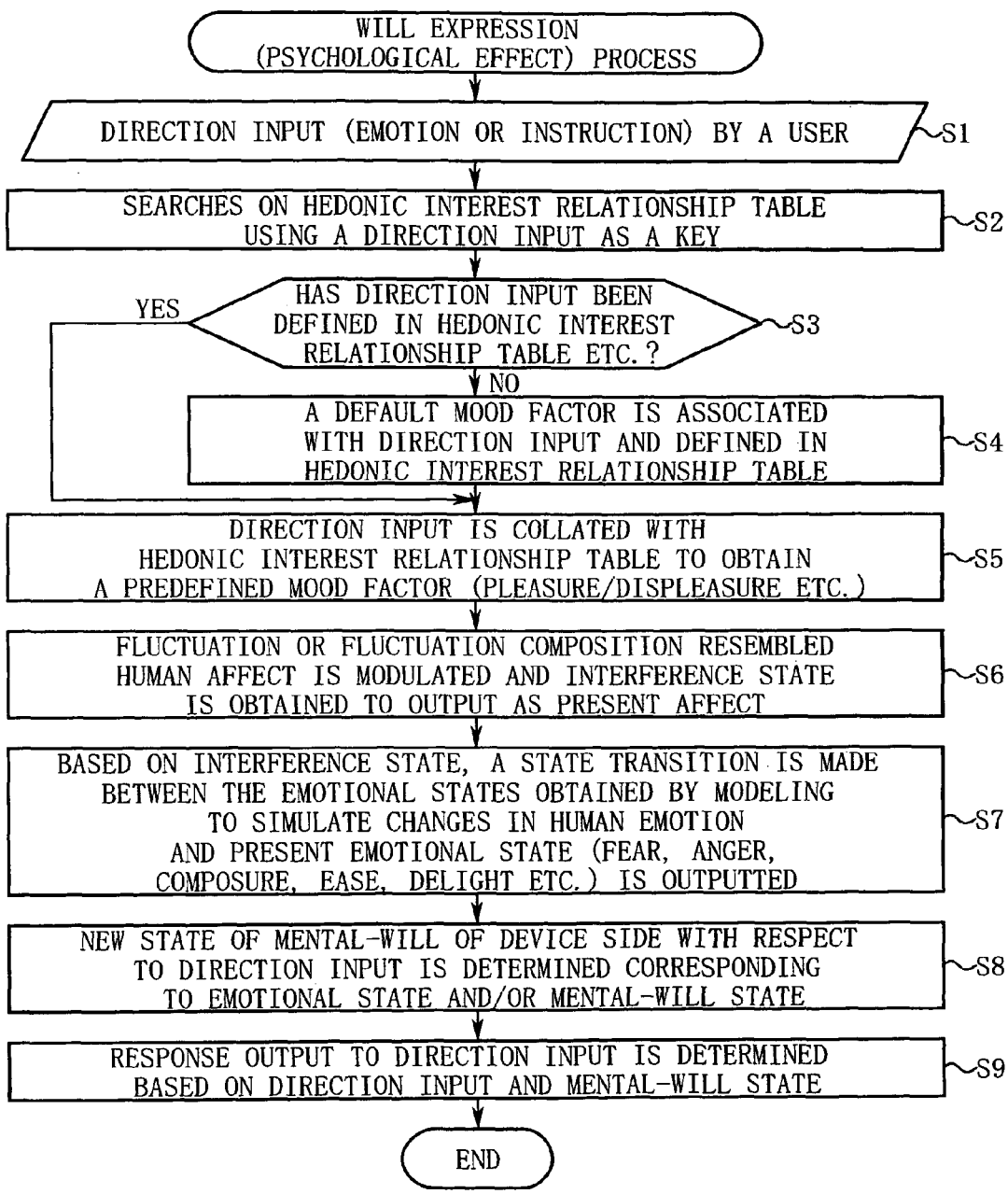
FIG. 2 is a flowchart showing a process of will-expression processing.

FIG. 2 is a flowchart showing an expression process of a will in the will-expression modeling device 10. Hereinafter, the will-expression process will be described in accordance with the step numbers in FIG. 2.

Step S1: A direction input is received from a user through an input device 11.

Step S2: The interest interpretation section 12 collates the received direction input with the predetermined hedonic interest relationship table.

Step S3: Here, when the direction input has been defined in the hedonic interest relationship table, the operation of the interest interpretation section 12 proceeds to step S5.

On the other hand, when the direction input is a new instruction and is not found in the hedonic interest relationship table, the operation of the interest interpretation section 12 proceeds to step S4.

Step S4: The interest interpretation section 12 associates a default mood factor with the new direction input and defines the same in the hedonic interest relationship table.

Here, when a final will-expression is made clear, the instruction input (described later, refer to FIG. 3) becomes more appropriate. Therefore, the default mood factor is preferably given with an extreme expression (strong pleasure or strong displeasure).

On the other hand, in the case where the direction input is a new one, there is a possibility that the direction input is reckless and inordinate. The will-expression modeling device 10 has to be protected from such unacceptable direction input. Therefore, with respect to a new direction input, a negative mood factor (strong displeasure) may be defined in default for convenience. In such a case, a cautionary human mentality can be simulated with respect to a new direction input.

After completing the above operation, the operation of the interest interpretation section 12 proceeds to step S5.

Step S5: The interest interpretation section 12 refers to the hedonic interest relationship table and obtains a mood factor (pleasure/composure/displeasure etc) corresponding to the direction input.

Step S6: The affect interference section 13a modulates the fluctuation or a fluctuation composition resembled human affect with a mood factor outputted by the interest interpretation section 12. Owing to the modulating operation, the affect, which interferes with the mood and changes, is simulated and outputted as an interference state of the affect.

Step S7: By virtually setting an emotional space using basic emotions such as delight, anger, sorrow and pleasure as axes, the emotion transition section 13b defines an emotional state in advance as a point on the emotional space. The emotion transition section 13b gives an interference state, which is changed due to the interfere by the mood factor, as transition amount to the emotional state, and the emotional state is caused to transit on the emotional space. Owing to the transition of the emotional state on the emotional space, a positional transition (state transition) of the emotional state is generated. By performing a transition of the emotional state as described above, a human-like emotional change is simulated.

Note that, by being adapted to communicate the emotional state thus detected to the outside, a communication and a heart-to-heart communication system capable of exchanging emotion and mentality (communication) may be preferably achieved.

Step S8: The will-expression section 14 estimates the present emotional state using a measure of will such as positive/negative, a mental-will state (willing agreement/acceptance/obedience/sympathetic/antipathy/refusal etc) with respect to the direction input is determined.

Also, by being adapted to reflect the conformity level (contradiction level) between the present emotional state and the mental-will state, a new mental-will state may be determined. For example, conformity of higher level is determined as convincing mental-will state; contrarily, a higher level of contradiction is determined as a mental-will state, which is unstable and strong frustration.

Note that, by being adapted to communicate the emotional state, which is detected as described above, to the outside, a communication and a heart-to-heart communication system capable of exchanging emotion and mentality (communication) may be preferably achieved.

Step S9: The output generating section 15 generates and outputs a response to the direction input corresponding to the mental-will state outputted by the will-expression section 14. The output generating section 15 communicates the response output to an outside user in an expression mode of "audio output", "text output", "computer animation", "motion and operation control of an automatic machine such as robot, automobile and air plane", "communication based on scenario generation", interface and operation system for computer and the like.

Owing to a series of operations as described above, the will-expression modeling device 10 can reply a human-like response output to the direction input.

[Redefinition Process of the Hedonic Interest Relationship Table]

Subsequently, processing of the instruction input received from an outside instructor will be described.

Figure 3:
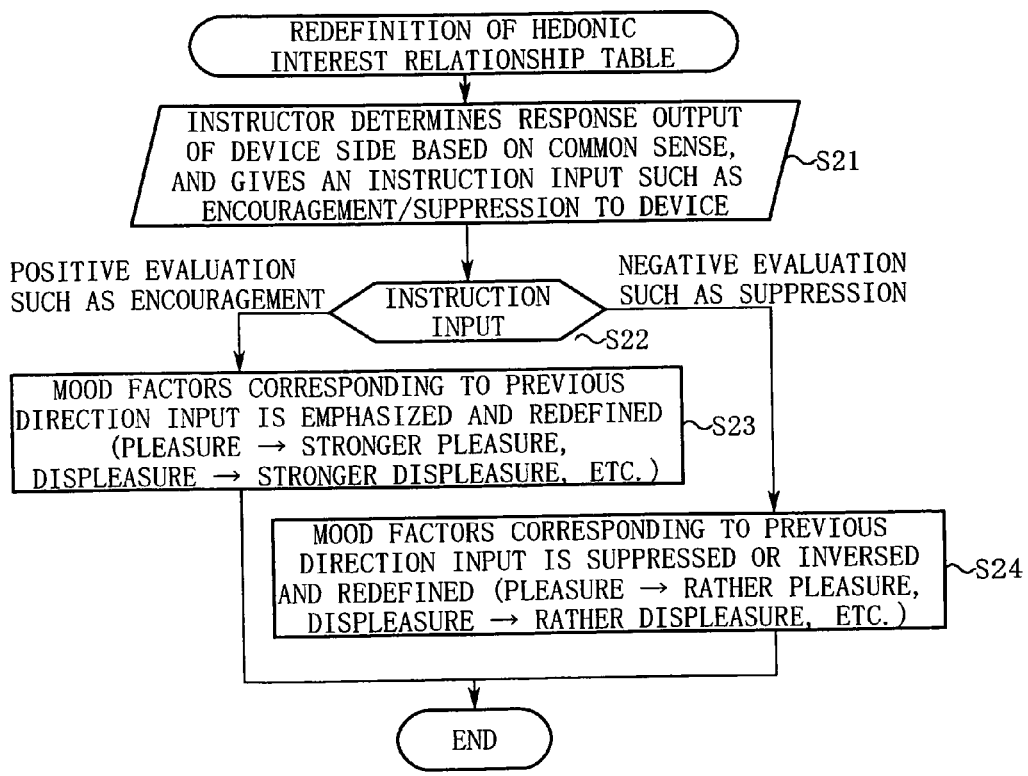
FIG. 3 is a flowchart showing a redefinition process of a hedonic interest relationship table.

FIG. 3 is a flowchart showing a processing operation of the interest interpretation section 12 when an instruction input is received. Hereinafter, the processing operation will be described in accordance with the step numbers in FIG. 3.

Step S21: The outside instructor (user, system administrator at a remote location or the like) monitors direction input and response output of the will-expression modeling device 10, if necessary. When the relationship between the direction input and the response input is appropriate, the instructor gives an instruction input representing an "encouragement" or the like to the will-expression modeling device 10 through the input device 11. Contrarily, when the relationship between the direction input and the response input is inappropriate, the instructor gives an instruction input representing a "suppression" or the like to the will-expression modeling device 10 through the input device 11.

Step S22: The interest interpretation section 12 makes plus/minus evaluation with respective to the given instruction input.

In the case of plus estimation like "encouragement", the interest interpretation section 12 proceeds to the operation in step S23.

On the other hand, in the case of minus evaluation like "suppression", the interest interpretation section 12 proceeds to the operation in step S24.

Step S23: The interest interpretation section 12 sets as it is or changes the mood factor corresponding to the direction input in the emphasizing direction to redefine the hedonic interest relationship table in accordance with the plus evaluation by the instructor. After such redefining, the interest interpretation section 12 terminates the operation.

Step S24: In accordance with the minus evaluation of the instructor, the interest interpretation section 12 changes the mood factor corresponding to the relevant direction input in the direction of suppression or inversion, and redefines the hedonic interest relationship table. After such redefining, the interest interpretation section 12 terminates the operation.

Owing to the series of operations as described above, in accordance with the determination of the instructor based on the common sense, the hedonic interest relationship table is gradually adjusted. As a result, a will-expression in accordance with the determination based on a highly human-like common sense can be simulated.

Next, another embodiment will be described.

Second Embodiment

A second embodiment is the embodiment corresponding to the appended claims 1 to 11. Note that, since the configuration of the second embodiment is the same as that of the first embodiment (FIG. 1), the description thereof will be omitted.

[Simulation Process of Mood]

Figure 4:
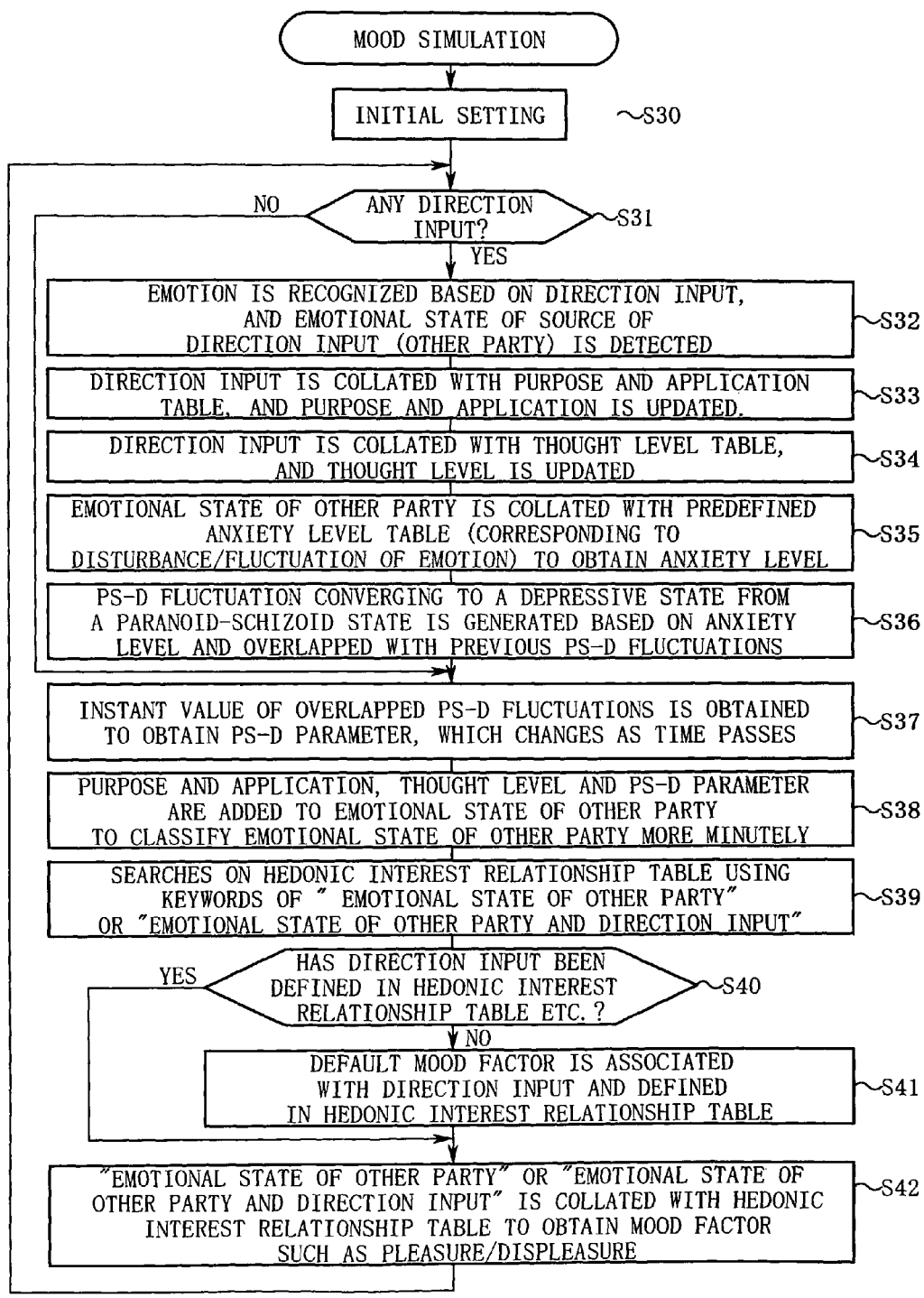
FIG. 4 is a flowchart showing a mood simulation (a kind of psycho-analysis) of a second embodiment.

FIG. 4 is a flowchart showing a mood simulation according to the second embodiment. Hereinafter, a simulation operation of mood generation will be described in accordance with the step numbers in FIG. 4.

Step S30: The interest interpretation section 12 performs an initial setting of parameter groups (purpose and application, thought level etc), which will be described later.

Step S31: The interest interpretation section 12 receives a direction input from a user through the input device 11. Here, a direction input by means of a voice input or a text input is received.

Upon receiving the direction input, the interest interpretation section 12 proceeds to the operation in step S32.

On the other hand, when no direction input is given, the interest interpretation section 12 proceeds to the operation in step S37.

Step S32: The interest interpretation section 12 recognizes an emotion based on the direction input. For example, as disclosed in the Japanese Unexamined Patent Application Publication No. 2002-215183, emotion of a speaker can be detected with a high accuracy based on inflection of the voice (period of appearance of identical frequency components) or the like.

Note that, by being adapted to communicate the emotional state, which is detected as described above, to the outside, a communication or a heart-to-heart communication system capable of exchanging emotion and mentality (communication) may be preferably achieved.

Step S33: The interest interpretation section 12 stores a predetermined purpose and application table. In the purpose and application table, typical direction inputs and the purpose and application thereof are associated with each other in advance by a system developer or the like. The interest interpretation section 12 collates the direction input with the purpose and application table to determine the purpose and application of the direction input.

Here, as an example, the following classification of the purpose and application is made.

(1) Proposal of hypothesis . . . a level in which other party speaks of a hypothesis (unknown whether it is true or not) as a passing idea. It is also called definitive hypothesis. Features of the direction input are: "It is . . . , I guess"; "I suppose that . . . ." etc.

(2) Escape from searching (ψ) . . . a level in which the other party is aware of the hypothesis but tries to escape from mental distress caused from being diffident in the hypothesis. Speak deceitful words, neglect the device side etc. Features of the direction input are: "Nonsense", "Stop it", "It's difficult", "You are worrying too much" etc.

(3) Notation . . . a level in which the other party simply picks up events; or a level gathering materials for searching. Features of the direction input are: "Um . . . ", "And also, . . . ," etc (4) Start of attention . . . a level in which the other party begins to be interested in the event; a level being drawn his/her attention, etc. Features of the direction input are: "Come to think about it", "Uh-oh" etc.

(5) Positive interpretation . . . a level in which the other party positively concentrates his/her attention; a level of positively searching for a response, etc. Features of the direction input are: "I remember that . . . ", "I figured out that . . . " etc.

(6) Action and interpretation . . . a level in which the thought of the other party progresses deeply and tries to lead to a conclusion and/or an action, etc. Features of the direction input are: "You should . . . ", "Absolutely", "Let's/Shall we . . . " etc.

Figure 5:
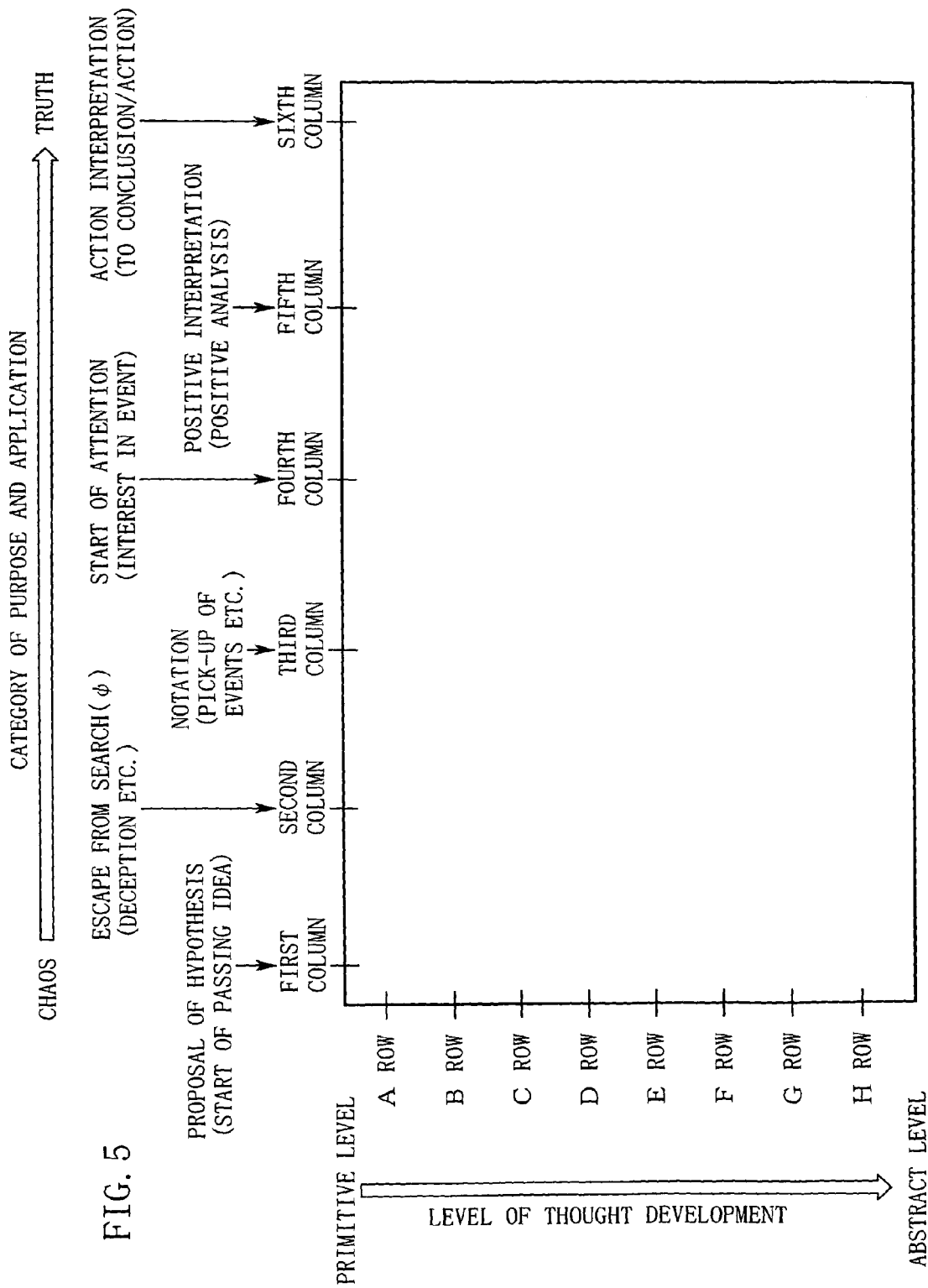
FIG. 5 is a diagram showing an example of classification of thought.

The horizontal axis in FIG. 5 indicates the above-described purpose and application (1) to (6).

Step S34: The interest interpretation section 12 stores a predetermined thought level table. The thought level table is a table for obtaining abstract level of the direction input.

The thought level table is organized by, for example, a system developer by allotting a point to the abstract level for each term included in a typical direction input. That is, when a large number of numerals and symbols are included in the direction input, the abstract level is high; or when many academic terms are included therein, the abstract level is high.

The interest interpretation section 12 collates the direction input with the thought level table to determine the thought level of the direction input. By performing such processing, the thought level of the other party can be roughly comprehended (refer to the vertical axis in FIG. 5).

Note that by being adapted to communicate the purpose and application and thought level, which is detected as described above, to the outside, a communication or a heart-to-heart communication system capable of exchanging emotion and mentality (communication) may be preferably achieved.

Step S35: The interest interpretation section 12 stores a predetermined anxiety level table. The interest interpretation section 12 collates the "emotional state of the other party" obtained in step S32 with the anxiety level table to obtain the anxiety level. In this anxiety level table, an emotional state, which incurs a stronger paranoid-schizoid, is allotted with a higher anxiety level. Also, the anxiety level table indicates a higher anxiety level to a kind of stressed state such as a large emotional change or an unnatural emotional change.

Step S36: The interest interpretation section 12 calculates to generate a larger PS-D fluctuation for a higher anxiety level. The PS-D fluctuation is such a fluctuation that swings over to a paranoid-schizoid state first and then converges to a depressive state. The convergent time and frequency of the PS-D fluctuation are preferably adjusted in advance so as to coincide with the period of time when the physical fluctuation of the other party converges. Also, the convergent time and the frequency may be adjusted based on the other party by analyzing the reaction of the other party at the device side.

Figure 6:
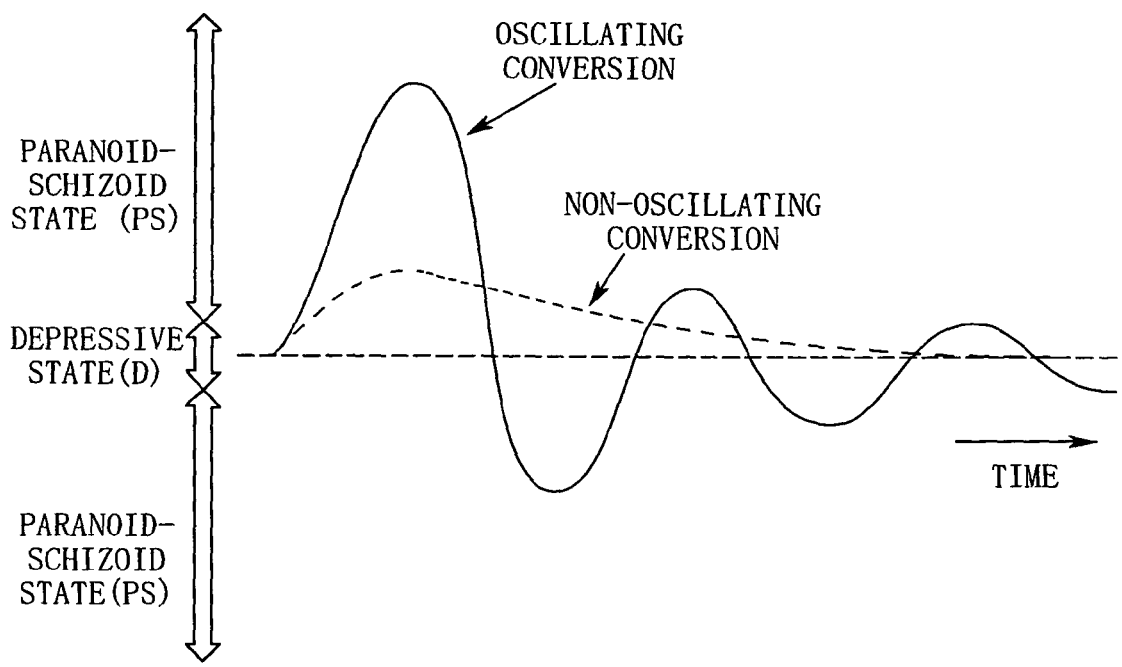
FIG. 6 is a diagram illustrating a PS-D parameter.

FIG. 6 is a diagram showing an example of such a PS-D fluctuation. The oscillation and convergence in FIG. 6 is a PS-D fluctuation, which swings between a paranoid-schizoid state and a depressive state due to a large anxiety, and then converges to a depressive state. On the other hand, non-oscillating convergence in FIG. 6 is a PS-D fluctuation, which swings once to a paranoid-schizoid state due to a small anxiety, and then returns to a depressive state soon. Since the PS-D fluctuation is generated as time passes, practically, plural PS-D fluctuations are in an interference state being overlapped and interfering with each other.

Thus, the interest interpretation section 12 overlaps the latest PS-D fluctuation with previous PS-D fluctuation and simulates the complicatedly fluctuating mentality of the other party. Here, a plurality of PS-D fluctuations may be simply added to each other. Also, mutual influence may be simulated by modulating the amplitude or frequency among the plurality of PS-D fluctuations.

Step S37: The interest interpretation section 12 outputs an instantaneous value of the overlapped PS-D fluctuations as the PS-D parameter, which changes as time passes.

Note that, by being adapted to communicate the PS-D parameter, which is detected as described above, to the outside, a communication or a heart-to-heart communication system capable of exchanging emotion and mentality (communication) may be preferably achieved.

Step S38: The interest interpretation section 12 adds "purpose and application", "thought level (abstract level of thought)" and "PS-D parameter" to the "emotional state of the other party" obtained in step S32 as item data for classifying emotions. Owing to this, the emotional state of the other party can be classified more minutely.

Note that, by being adapted to communicate the emotional state, which is minutely classified as described above, to the outside, a communication or a heart-to-heart communication system capable of exchanging emotion and mentality (communication) may be preferably achieved.

Step S39: The interest interpretation section 12 searches on the hedonic interest relationship table using a keyword of "emotional state the other party" or "emotional state of the other party and direction input". When the threshold value of the PS-D parameter is determined and when the fluctuation exceeds the threshold value, the search is preferably made on another hedonic interest relationship table, which is separately prepared for a psychologically unstable state.

Steps S40 to S41: processing identical to steps S3 to S4 in the first embodiment.

Step S42: The interest interpretation section 12 collates an "emotional state of the other party" or an "emotional state of the other party and direction input" with the hedonic interest relationship table to obtain a mood factor such as a pleasure or displeasure. The mood factor is used in will-expression simulation (which will be described later.) After completing the above processing, the interest interpretation section 12 returns to the operation in step S31.

[Simulation Processing of Will-Expression]

Figure 7:
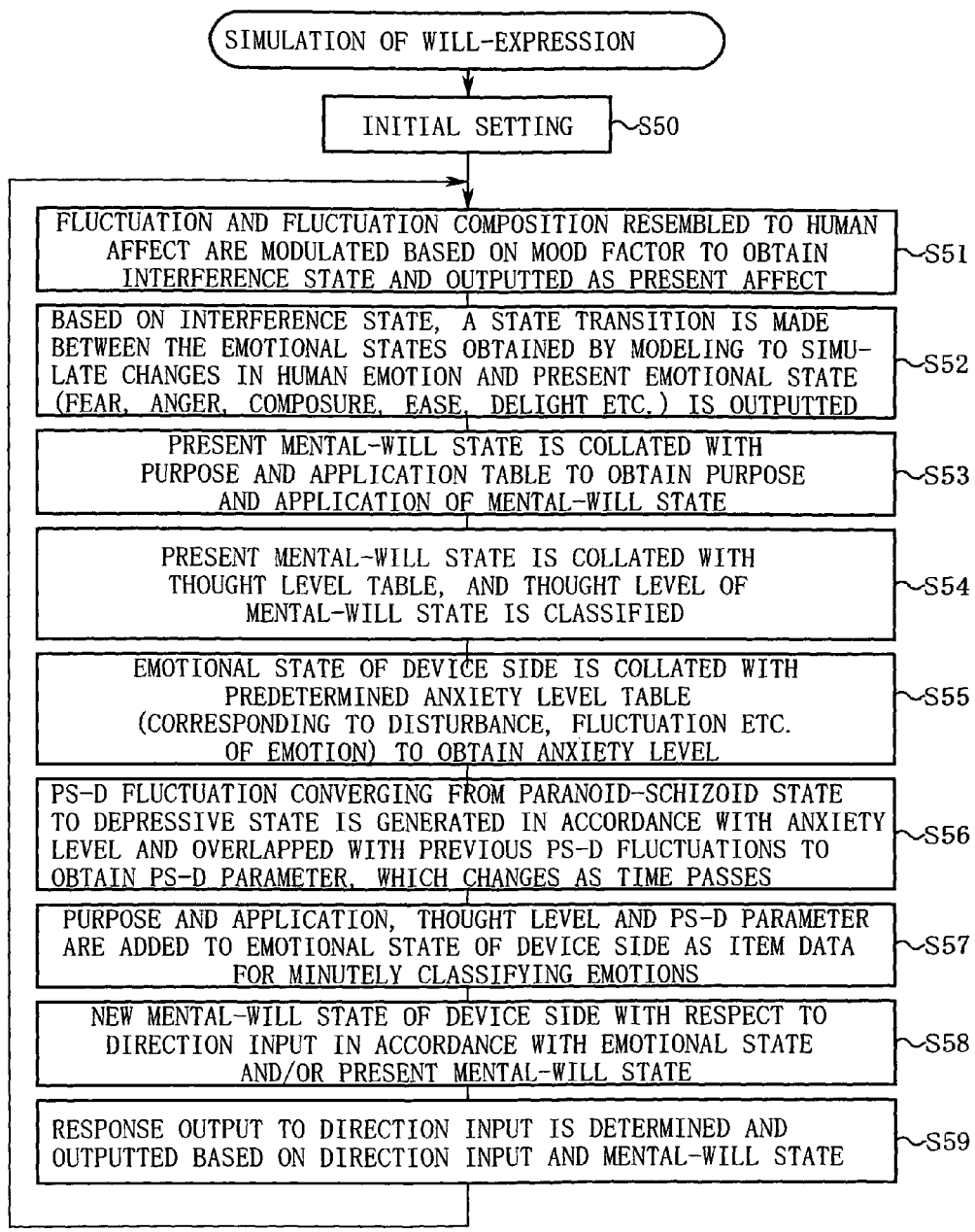
FIG. 7 is a flowchart of will-expression simulation (a kind of virtual ego) of the second embodiment.

FIG. 7 is a flowchart showing a will-expression simulation in the second embodiment.

The operation of a will-expression will be described below in accordance with step numbers in FIG. 7.

Step S50: Initial setting of parameter groups (mental-will state etc, which will be described later) is made.

Step S51: The affect interference section 13*a* modulates the fluctuation and the fluctuation composition resembled to human affect with the mood factor outputted from the interest interpretation section 12. Owing to the modulating operation, affect, which interferes with mood and changes, is simulated and outputted as an interference state of the affect (Note that communication of emotion can be achieved by communicating the obtained interference state of the affect.)

Step S52: The emotion transition section 13*b* virtually sets up an emotional space using basic emotions such as delight, anger, sorrow, pleasure and the like as axes, and emotional states are predetermined in advance as points on the emotional space. The emotion transition section 13*b* gives an interference state, which changes due to interference with the mood factor, to the emotional state as a transition amount, and the emotional state is caused to transit on the emotional space. Owing to the transition of the emotional state on the emotional space, a positional transition of the emotional state (state transition) is generated. By performing the above transition of the emotional states, human-like emotional changes can be simulated.

Note that, by being adapted to communicate the emotional state, which is generated as described above, to the outside, a communication or a heart-to-heart communication system capable of exchanging emotion and mentality (communication) may be preferably achieved.

Step S53: The emotion creating section 13 stores a predetermined purpose and application table. In the purpose and application table, a system developer or the like determines mental-will states and the purpose and application, which is associated therewith. The emotion creating section 13 collates the present mental-will state with the purpose and application table to obtain the purpose and application representing the mental-will state.

For example, the purpose and application is classified into the following items.

(1) Proposal of hypothesis . . . a group of mental-will states (manic state) in which the device side outputs an unrelated proposal in accordance with a predetermined scenario.

(2) Escape from searching ($\psi$) . . . a group of mental-will states (reaction to the manic state) in which the device side outputs a try-on, an escape or further illogical proposal after the proposal based on a passing idea is rejected.

(3) Notation . . . a group of mental-will states in which the device side stores the direction input from the other party as an event on the memory or outputs a previous event stored on the memory as it is.

(4) Start of attention . . . a group of the mental-will states in which the device side selects a previous event in the memory on the basis of the relationship with the present direction input to put the memory in order and simulates the enhancement of interest.

(5) Positive interpretation . . . a group of the mental-will states in which the device side positively outputs an event limited by the choice.

(6) Action and interpretation . . . a group of mental-will states in which the device side heightens the will due to approval by the other party or the like, and further proceeds the choice to derive a conclusion.

Step S54: The emotion creating section 13 stores a predetermined thought level table. The thought level table is a table, which defines in advance at what thought level from a primitive level to an abstract level the mental-will state is. For example, a mental-will state, which generates more concrete response output, is classified to a primitive thought level. A mental-will state, which generates sensuous and visual response output, is classified to an intermittent thought level close to dream thought, dream and myths. Further, a mental-will state, which generates response output including concepts, academic terms and the like, is classified to an abstract and high thought level.

The emotion creating section 13 collates the present mental-will state with the thought level table, and classifies the mental-will state to a thought level in accordance with the abstract level.

Also, by being adapted to communicate the purpose and application and thought level, which are generated as described above, to the outside, a communication or a heart-to-heart communication system capable of exchanging emotion and mentality (communication) may be preferably achieved.

Step S55: The emotion creating section 13 stores a predetermined anxiety level table. The emotion creating section 13 collates the "emotional state of the device side" obtained in step S52 with the anxiety level table to obtain an anxiety level. In the anxiety level table, an emotional state, which incurs a stronger paranoid-schizoid, represents a higher anxiety level. Also, the higher anxiety level is expressed with respect to a kind of stress such as a large emotional change, unnatural emotional change or the like.

Step S56: The emotion creating section 13 calculates to generate the larger PS-D fluctuation to the higher anxiety level. The PS-D fluctuation is a fluctuation which swings to a paranoid-schizoid state once and then converges to a depressive state as shown in FIG. 6.

The PS-D fluctuation, which is successively generated on the time-axis, is overlapped with the previous PS-D fluctuations to generate a complicatedly fluctuating mentality of the device itself.

The emotion creating section 13 outputs an instantaneous value of the overlapped PS-D fluctuations as a PS-D parameter, which changes as time passes.

Note that, by being adapted to communicate the PS-D parameter, which is generated as describe above, to the outside, a communication or a heart-to-heart communication system capable of exchanging emotion and mentality (communication) may be preferably achieved.

Step S57: The emotion creating section 13 adds a "purpose and application", a "thought level (abstract level of thought)" and a "PS-D parameter" to the "emotional state of the device side" obtained in step S52 as item data for classifying the emotion. Owing to this, the emotional state of the device side can be classified more minutely.

Also, by being adapted to communicate the emotional state, which is minutely classified as described above, to the outside, a communication or a heart-to-heart communication system capable of exchanging emotion and mentality (communication) may be preferably achieved.

Step S58: The will-expression section 14 determines the next mental-will state (willing agreement, acceptance, obedience, sympathy, antipathy, refusal etc) in accordance with the minute classification of the emotional state of the device side obtained in step S57.

Also, by being adapted to communicate the mental-will state, which is generated as described above, to the outside, a communication or a heart-to-heart communication system capable of exchanging emotion and mentality (communication) may be preferably achieved.

Step S59: After carrying out the same process as that of step S9 in the first embodiment, the operation is returned to step S51.

Compliments of Embodiment

Now, as described above, by adding the PS-D parameter to both of the emotion detection of the other party and the emotion creation of the device side, emotional relationship between the other party and the device side can be produced. The description about that will be given below.

First of all, the fluctuation expressed by the PS-D parameter can be understood as a rhythm or fluctuation (emotional rhythm), which is generated in the emotional state and disappears therefrom. A communication, which simulates a heart-to-heart communication utilizing the above, is possible.

It is possible that, after enhancing the simulation accuracy of the emotional rhythm of the other party, a fluctuation close to the emotional rhythm of the other party can be given to the emotional state of the device side utilizing the PS-D parameter. In this case, the device side can have emotional fluctuation close to that of the other party. In this state, a partner-like device, which is in concert or gets along with the other party, is produced (creation of a kind of emotional resonant state). Contrarily, by giving a fluctuation out of the emotional rhythm of the other party to the emotional state of the device side, such a device that is out of rhythm or uncongenial with the other party may be produced (creation of emotional dissonance).

Also, a communication means, which exchanges such an emotional state, can be obtained.

It is to be noted that the present invention may be implemented in various manners without departing from the sprit or primary characteristics thereof. Therefore, since the above-described embodiments are given as examples only in all aspects, they should not be interpreted in a limited manner. The present invention is prescribed by the claims but is not constrained by the explanations in the description. Furthermore, any modifications or changes pertinent to the equivalent range of the claims should be understood to be included in the present invention.

The invention is not limited to the above embodiments and various modifications may be made without departing from the spirit and scope of the invention. Any improvement may be made in part or all of the components.

INDUSTRIAL APPLICABILITY

As described above, the present invention is a technique applicable to achieve a machine, which simulates human-like will expression.

The invention claimed is:

1. A will-expression modeling device simulating human will-expression responding to an direction input given from the outside, comprising:
   a computer;
   an interest interpretation section, implemented on the computer, that collates said direction input with a predetermined hedonic interest relationship table and outputs a mood factor representing pleasure/displeasure;
   an emotion creating section, implemented on the computer, that prepares a plurality of emotional states obtained by modeling human emotions and causes state transitions to occur in the emotional states according to said mood factor to simulate a change in human emotion responding to said direction input; and
   a will-expression section, implemented on the computer, that prepares in advance a plurality of mental-will states obtained by modeling human will and selects a new mental-will state from said emotional states or a combination of a mental-will state and an emotional state,
   wherein
   when receiving an instruction input of encouragement or suppression based on a relationship between said direction input and said mental-will states being selected from an outside instructor, said interpretation section redefines said hedonic interest relationship table in response to said instruction input to make said will-expression closer to human common sense and super-ego.

2. The will-expression modeling device according to claim 1, wherein said emotion creating section includes:
   an affect interference section, implemented on the computer, that prepares in advance a function obtained by modeling spontaneous rhythm of human affect and generates an interference state by modulating said function with said mood factor; and
   an emotion transition section, implemented on the computer, that simulates the change in human emotion by causing the state transitions to occur in said emotional states based on said interference state.

3. The will-expression modeling device according to claim 1, further comprising
   an output generating section, implemented on the computer, that generates a scenario or motion as an output responding to said direction input by selecting, modifying, or combining prepared action pattern(s) in accordance with a selected mental-will state.

4. The will-expression modeling device according to claim 1, wherein said interest interpretation section:
- detects an emotional state of an direction input source based on said direction input; and
- collates the emotional state of the direction input source or said direction input and the emotional state of the direction input source with said hedonic interest relationship table to output the mood factor representing pleasure/displeasure.

5. The will-expression modeling device according to claim 4, wherein said interest interpretation section:
- collates said direction input with a predetermined purpose and application table to detect a purpose and application of said direction input;
- collates said direction input with a predetermined thought level table to detect at what thought level from a primitive level to an abstract level a thought of said other party is; and
- detects in further detail the emotional state of said other party by adding said purpose and application and said thought level as classification item data to the detected emotional state of said other party.

6. The will-expression modeling device according to claim 4, wherein said interest interpretation section:
- generates a PS-D parameter that converges from a paranoid-schizoid state to a depressive state in an oscillating or non-oscillating manner in accordance with the level of anxiety represented by the emotional state of said other party; and
- detects in further detail the emotional state of said other party by adding said PS-D parameter as classification item data to the detected emotional state of said other party.

7. The will-expression modeling device according to claim 1, wherein said emotion creating section:
- collates said mental-will state with the predetermined purpose and application table to detect a purpose and application of said mental-will state;
- collates said mental-will state with the predetermined thought level table to detect at what thought level from a primitive level to an abstract level said mental-will state is; and
- detects in further detail the emotional state of said device side by adding said purpose and application and said thought level as classification item data to said emotional state of the device side.

8. The will-expression modeling device according to claim 1, wherein said emotion creating section:
- generates a PS-D parameter that converges from a paranoid-schizoid state to a depressive state in an oscillating or non-oscillating manner in accordance with the level of anxiety represented by said emotional state of the device side; and
- detects in further detail the emotional state of said device side by adding said PS-D parameter as classification item data to said emotional state of the device side.

9. A psycho-effect program causing the computer to function as a will-expression modeling device according to claim 1.

10. A method of causing a computer to simulate human will-expression responding to a direction input given from the outside, the method comprising:
- collating, by the computer, said direction input with a predetermined hedonic interest relationship table and outputting a mood factor representing pleasure/displeasure;
- preparing, by the computer, a plurality of emotional states obtained by modeling human emotions and causing state transitions to occur in the emotional states according to said mood factor to simulate a change in human emotion;
- preparing, by the computer, in advance a plurality of mental-will states obtained by modeling human will and selecting a new mental-will state from said emotional states or a combination of a mental-will state and an emotional state, and
- when receiving an instruction input of encouragement or suppression based on a relationship between said direction input and said mental-will states being selected from an outside instructor, refining, by the computer, said hedonic interest relationship table in response to said instruction input to make said will-expression closer to human common sense and super-ego.

* * * * *